Figure 1:
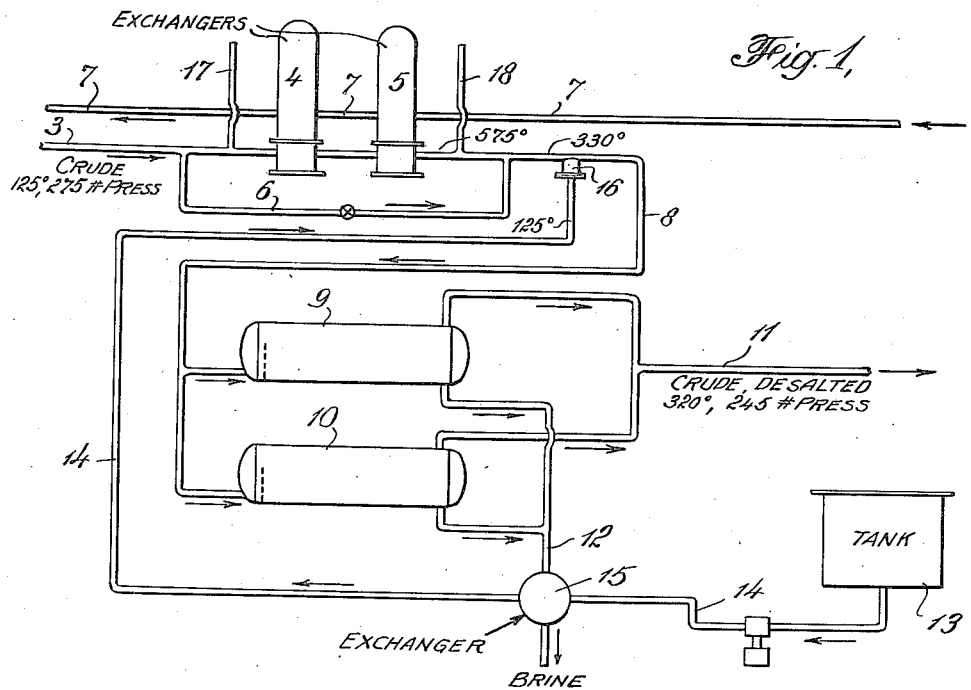

May 11, 1943.　　　D. S. MELLETT　　　2,319,188

PROCESS FOR DESALTING CRUDE

Filed Aug. 22, 1940

INVENTOR
DANA S. MELLETT
BY
Arthur V. Danner
ATTORNEY

Patented May 11, 1943

2,319,188

UNITED STATES PATENT OFFICE 2,319,188

PROCESS FOR DESALTING CRUDE

Dana S. Mellett, Upper Darby, Pa., assignor to Socony-Vacuum Oil Company, Incorporated, New York, N. Y., a corporation of New York Application August 22, 1940, Serial No. 353,622

6 Claims. (Cl. 252—348)

This invention is directed to the removal of salt from crude oil. Salt, in the form of chlorides of sodium, magnesium, and/or calcium is quite frequently associated with crude petroleum, usually in the form of a salt brine emulsified with the oil.

The removal of this salt prior to any distillation process or cracking process wherein the crude petroleum, reduced crude, or the like, is subjected to heating, is necessary, since the salt gives rise to considerable difficulties. It deposits upon heating surfaces and in the tubes of heating equipment, such as stills, heat exchangers, and the like, when certain temperatures are reached, plugging the equipment, reducing its flow capacity, reducing the heat transfer capability of the equipment, and generally causing serious trouble. Additionally, particularly if magnesium chloride be present, it gives rise to serious corrosion and other difficulties. Recently, salt difficulties have increased somewhat due to increased salt contents arising from acid treatment of producing wells.

The removal of salt, when present, is difficult, due to the persistence with which these dispersions of salty material resist resolution and removal. Much work has been done upon methods revolving around washing oil with water at elevated temperatures, and in some cases, comparative success has been attained.

This invention is directed specifically to an improvement in methods for salt removal capable of more effective removal than the usual washing and adaptable to many crudes and residues which effectively resist ordinary methods of treatment.

This invention has for its object the provision of a method of salt removal wherein a greater freedom from salt is obtained than in water washing at elevated temperature, particularly applicable to oils where the salt is finely and widely dispersed in such form as to be difficult of removal by washing.

This invention is based upon the concept of widely dispersing a small additional amount of water, under certain conditions, into the oil, after which the resulting dispersion is resolved and removed.

In order to understand this invention, reference is made to the drawing attached hereto. In the drawing Figure 1 shows a conventional salt removal set-up of the prior art, modified for the practice of the present method, in diagram form, and Figure 2 shows a device used in connection with the present method, in diagram form, in section.

Figure 2:
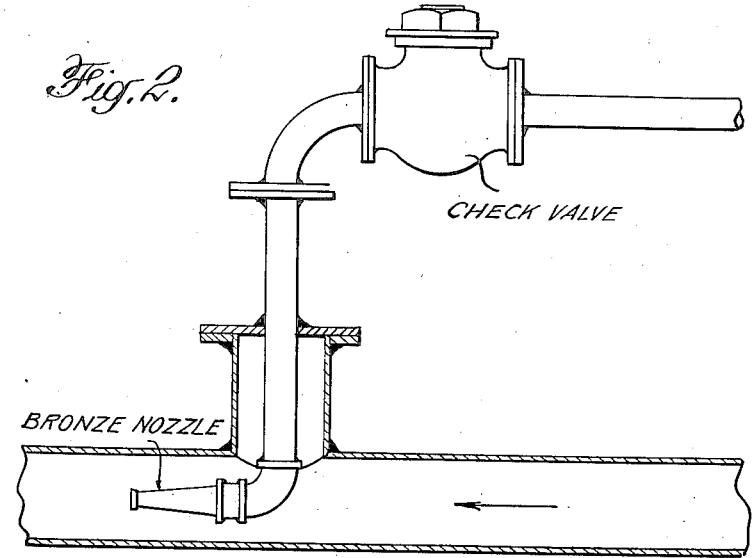

In Figure 1, the conventional set-up of the prior art appears as follows. Crude oil, entering through pipe 3, passes through heat exchangers 4 and 5, a portion being by-passed by pipe 6. A hot material from the process to which the crude is passing, or from some other source, passes by pipe 7 through exchangers 4 and 5. The crude oil, heated in the exchangers, goes by pipe 8 to settler drums 9 and 10, where the separation of brine and oil takes place, oil being withdrawn by pipe 11 and brine by pipe 12. A solution of soda ash, useful as an emulsion breaker was introduced from tank 13 by pipe 14, being first heated in exchanger 15, and then injected to pipe 8 at point 16. In the normal method of operation, according to the prior art, the heating is utilized for resolving and breaking the emulsion, and subsequent settling is utilized for separation and removal of brine. In some cases, additional water may be added to the crude before heating, and emulsion breakers for separation aid. The degree of heating is to a temperature above the normal boiling point of water, but under such pressure as to prevent vaporization of the water and maintain it in the liquid phase. With a particular crude oil, the results of such a system have been found to be as follows:

Table I

| | |
|---|---|
| Salt #/1000 bbls. incoming oil | 83.5 |
| Salt #/1000 bbls. outgoing oil | 25.0 |
| Salt #/1000 bbls. removed | 58.5 |

Efficiency of salt removal, 70%.

This conventional system has been modified to operate according to the present invention by adding pipes 17 and 18 by which water might be injected into the flowing stream of oil either before or after the heat exchangers. The procedure was then altered so that the flow of oil through the exchangers brought the oil passing therethrough to a temperature of 575° F., enough oil passing through by-pass line 6 to reduce the oil stream temperature after it entered pipe 8 to about 330° F., the oil being under about 275#/square inch gauge pressure.

Figure 2 shows in section, the device utilized for injection, and is believed not to require detailed explanation.

Returning now to Figure 1, as modified, it is seen that the process of treatment now includes the step of adding water, causing the vaporization of that water into steam distributed throughout a portion of the oil, then condensing the steam to give water distributed in fine particles throughout the oil, and then settling.

This process gives salt removal results of a quite different order. When introducing the additional water by pipe 18, at a point beyond the heat exchanger, using 8 gallons water per minute for a crude oil flow of 21,000 barrels per day, that is, a water addition of the order of 1.3% by volume, continuing the addition of soda ash solution at 16 in the same manner as before, the results were:

Table II

Salt #/1000 bbls. incoming oil_____ 91
Salt #/1000 bbls. outgoing oil_____ 13

Salt #/1000 bbls. removed_____ 78
Efficiency of salt removal, 85.7%.

As a further test, the point of addition of the water was then changed from pipe 18 to pipe 17, that is to a point before the exchangers, where longer time and the turbulence of passage through the exchangers assured a more complete dispersion of the water throughout the oil than at pipe 18. In this case the data were:

Table III

Salt #/1000 bbls. incoming oil_____ 85.5
Salt #/1000 bbls. outgoing oil_____ 5.0

Salt #/1000 bbls. removed_____ 80.5
Efficiency of salt removal, 94.3%.

This degree of salt removal has been attained in continuous operation over a considerable period.

The significant step is that of adding of small amount of water in such manner as to insure its being extremely finely dispersed in the oil, thereby enabling it to contact the similarly dispersed salt. This addition and dispersion may be effected by several means, all aiming at the dispersion of steam throughout the oil, followed by condensation of that steam. It may be accomplished as shown by jetting water into oil and then heating said oil well above the boiling point of water at the pressure condition obtaining, as when introducing by pipe 17, in each of which cases the production of steam and its dispersion in the oil is followed by a cooling to condense the steam to water, well dispersed, as by the return of by-passed oil by pipe 6, or equally well by a conventional cooling step conducted in a heat exchanger. It may be accomplished equally well by injecting high pressure steam into relatively cool crude, wherein the dispersion of small particles of steam throughout the crude would be mechanically obtained and the condensation follow thereafter because of the temperature of the crude. In such a case as the latter, the temperature conditions should be such that the crude, after condensation of the steam, is at a proper settling temperature.

The amount of water to be used will be varied depending upon the nature of the material to be handled. It will be possible to accomplish the object of this invention with from about .5 volume percent of water to about 3.3 volume percent of water, with a preferred operating range being about 1.3 volume percent of water for crudes normally encountered and containing about 60 to 300 pounds of salt (as NaCl) per 1000 barrels of oil.

As a demulsifying agent, soda ash is quite effective, and may be used in various amounts, as directed by the resistance of the crude oil. It is convenient to use a solution having a concentration of about 2½ pounds soda ash per 100 gallons water, and in the tests and operation reported above, this was utilized at a rate of about 6.5% by volume of the oil treated. Other chemical demulsifying agents, such as, for example, sulphonated fatty acids, or the like, may be used similarly, adjustments being made appropriately to each.

I claim:

1. That process of removing salt from petroleum oils which comprises, finely dispersing water into the oil, raising the temperature of the dispersed water while in contact with the oil to a value well above the boiling point of water under the pressure existing at the time of heating to secure a fine dispersal of steam in said oil, then cooling the mixture to secure condensed water finely dispersed in said oil, and then settling and separating said water plus salt or salt brine from said oil at an elevated temperature.

2. The process of claim 1 in which a demulsifying agent is added subsequent to the condensation of steam and prior to settling.

3. That process of removing salt or salt brine from petroleum comprising finely dispersing water into oil which is well above the boiling point of water under the pressure existing at the point of injection to secure a fine dispersal of steam in said oil, then cooling the mixture to secure condensed water finely dispersed in said oil, and then settling and separating said water plus salt or salt brine from said oil at an elevated temperature.

4. The method of claim 3 in which a chemical demulsifying agent is added to the oil-water mixture subsequent to condensation of water and prior to settling.

5. That process of removing salt or salt brine from petroleum comprising finely dispersing water into said oil and heating the oil-water mixture to a temperature above the boiling point of water under the pressure existing in the system and under such conditions as to secure dispersion of steam throughout oil, then cooling the mixture to secure condensed water dispersed throughout said oil, and finally settling and separating said water, plus salt or salt brine, from said oil, at an elevated temperature.

6. The method of claim 5 in which a chemical demulsifying agent is added to the oil-water mixture subsequent to condensation and prior to settling.

DANA S. MELLETT.